(12) United States Patent
Ash et al.

(10) Patent No.: US 10,335,879 B2
(45) Date of Patent: Jul. 2, 2019

(54) METHOD AND APPARATUS FOR FORMING A VEHICLE WINDOW ASSEMBLY USING INDUCTION SOLDERING

(71) Applicant: Pilkington Group Limited, Latham (GB)

(72) Inventors: Charles E. Ash, Perrysburg, OH (US); Charles Sitterlet, Northwood, OH (US)

(73) Assignee: Pilkington Group Limited, Lathom (GB)

( * ) Notice: Subject to any disclaimer, the term of this patent is extended or adjusted under 35 U.S.C. 154(b) by 153 days.

(21) Appl. No.: 15/706,455

(22) Filed: Sep. 15, 2017

(65) Prior Publication Data

US 2018/0050403 A1 Feb. 22, 2018

Related U.S. Application Data

(63) Continuation of application No. 14/097,646, filed on Dec. 5, 2013, now abandoned.

(60) Provisional application No. 61/746,179, filed on Dec. 27, 2012.

(51) Int. Cl.
| | |
|---|---|
| *B23K 1/002* | (2006.01) |
| *H05B 6/10* | (2006.01) |
| *H05B 6/22* | (2006.01) |
| *B23K 1/00* | (2006.01) |
| *B23K 101/00* | (2006.01) |

(52) U.S. Cl.
CPC ............ *B23K 1/002* (2013.01); *B23K 1/0008* (2013.01); *B23K 2101/006* (2018.08)

(58) Field of Classification Search
CPC .. B23K 1/0004; B23K 1/0008; B23K 1/0012; B23K 1/0014; B23K 1/0016; B23K 1/0018; B23K 1/002; B23K 1/005; B23K 2101/006; B23K 37/047; H05B 6/02; H05B 6/101; H05B 6/105; H05B 6/14; H05B 6/24; H05B 6/36; H05B 6/362; H05B 6/40; H05B 6/44

USPC ............ 219/78.01, 85.1, 85.16, 85.2, 85.21, 219/85.22, 129, 600, 615, 616, 617, 219/633–635, 645, 647, 656, 676; 65/33.4, 33.5, 63, 104, 106, 135.6–135.8, 65/152–155, 182.1, 182.2, 182.4, 65/227–301, 287, 507–509; 156/60–98, 156/99–107, 123, 124, 230–241, 379.7, 156/379.8; 228/6.1, 6.2, 24, 41, 49.2, 228/51–55, 56.3, 111.5, 234.1, 254

See application file for complete search history.

(56) References Cited

U.S. PATENT DOCUMENTS

| | | | | |
|---|---|---|---|---|
| 3,685,714 | A * | 8/1972 | Moyer | B23K 1/0008 228/41 |
| 3,940,046 | A * | 2/1976 | Fern | B23K 3/00 219/85.1 |
| 4,530,456 | A * | 7/1985 | Michelotti | B23K 37/00 228/6.2 |
| 2003/0178394 | A1* | 9/2003 | Johnson | B23K 1/0053 219/85.13 |
| 2012/0103512 | A1* | 5/2012 | Kovach | C09J 5/06 156/60 |

\* cited by examiner

*Primary Examiner* — Hung D Nguyen
(74) *Attorney, Agent, or Firm* — Marshall & Melhorn, LLC

(57) ABSTRACT

Induction soldering via an assembly fixture is utilized to bond one or more items of hardware to a vehicle window to form a vehicle window assembly. A method of operating the assembly fixture to bond the one or more items of hardware to a vehicle window by induction soldering is also an aspect of the invention.

14 Claims, 8 Drawing Sheets

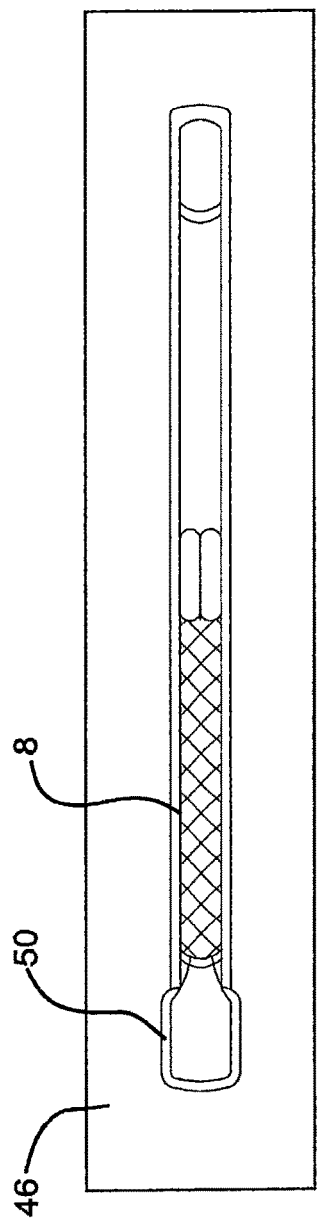
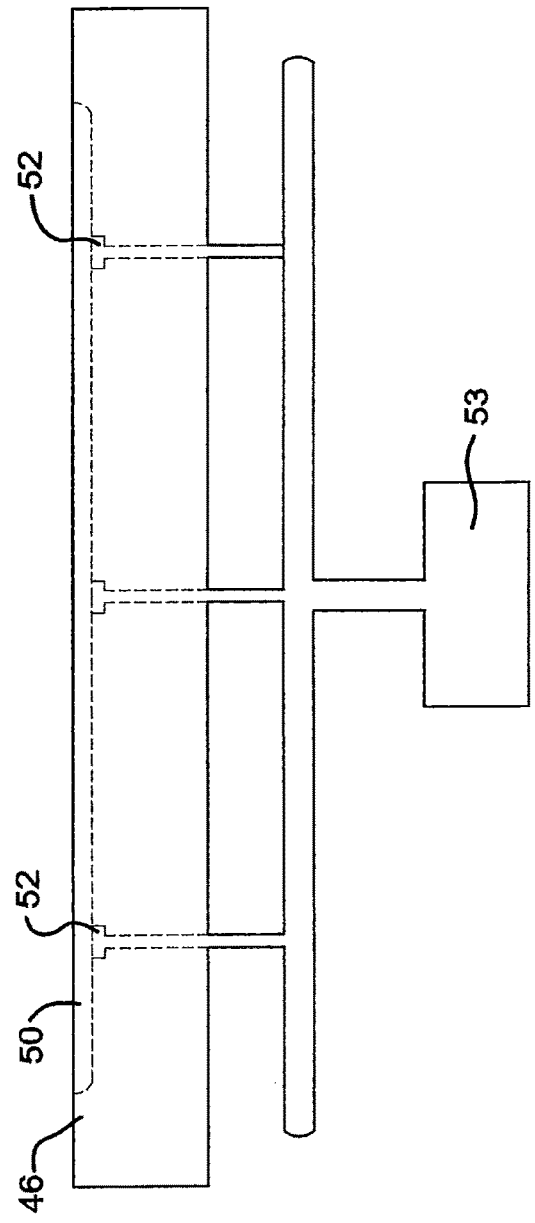
Fig. 7a
Fig. 7b

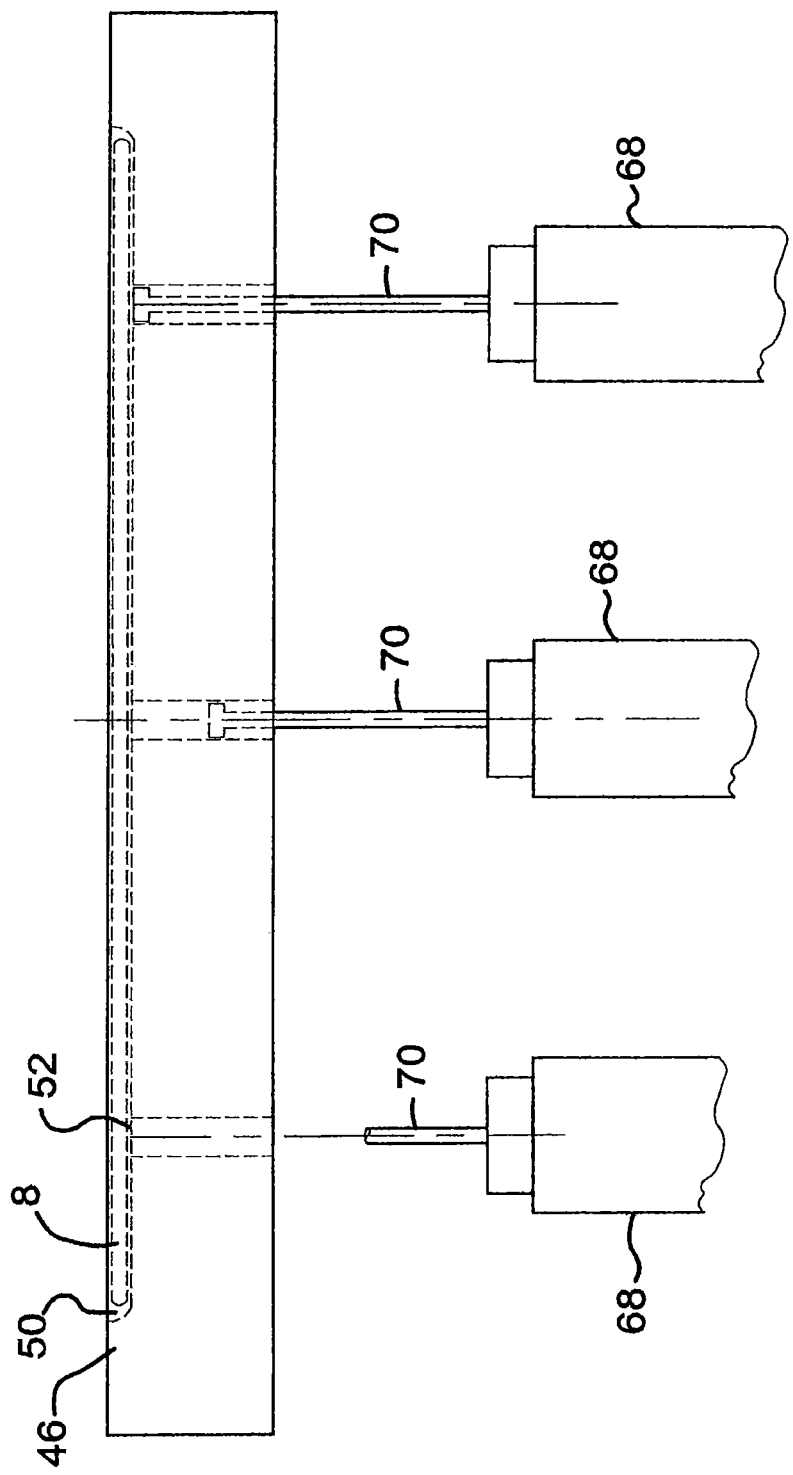

METHOD AND APPARATUS FOR FORMING A VEHICLE WINDOW ASSEMBLY USING INDUCTION SOLDERING

RELATED APPLICATION

This application is a continuation of U.S. Ser. No. 14/097,646, which was filed on Dec. 5, 2013, which claims the benefit under 35 U.S.C. 119(e), of provisional application 61/746,179 filed Dec. 27, 2012. Each of these applications are hereby incorporated by reference in their entirety.

BACKGROUND

The present invention relates to a method and apparatus for bonding an item to a substrate. More particularly, the invention relates to bonding an item of hardware to a glass substrate by induction soldering, utilizing an assembly fixture.

Induction heating for soldering has been described in the patent literature, for example:

U.S. Pat. No. 4,128,449 describes a fixture for applying discrete adhesive-backed articles to a support surface through the use of induction heat. Aligning and positioning means are associated with the faces of U-shaped cores to keep the end faces of the core in abutting relationship with the article being heated, but is said to permit the article and core combination to move slightly in a compound direction to accommodate support surface variations or curvature.

U.S. Pat. No. 5,977,527 describes a fixture for an induction brazing station including a removable front plate on which a work piece holder is mounted. The base of the induction unit mounts to a back plate lying coplanar with the front plate on the work surface. The coil of the induction unit is uniquely matched to the front plate and the work piece holder. The induction coil removably mounts to the front plate when not in use such that the front plate may be removed from the work surface with the work piece holder and coil mounted thereon. A different front plate may then be mounted upon the work surface having a different coil configuration and work piece holder.

U.S. Pat. No. 6,849,837 describes a method for using magnetic fields to heat magnetically susceptible materials within and/or adjacent to adhesives so as to bond, bind or fasten solid materials to one another. The system uses alternating magnetic fields that induce eddy currents and generate heat within susceptors. An induction heating tool is used to emit the magnetic field at its work coil and an electronic controller measures the energy being used by a power converter that generates the alternating current driving the work coil which creates the magnetic field.

U.S. Pat. No. 8,299,401 describes an apparatus and a method of using induction heating to solder an item of hardware to a glass substrate, wherein the glass substrate is preferably a vehicle window, the substrate and bonded items(s) of hardware forming a vehicle window assembly.

SUMMARY OF THE INVENTION

The present invention relates to a method and apparatus for bonding an item to a substrate. More particularly, the invention relates to bonding an item of hardware to a glass substrate by induction soldering utilizing an assembly fixture.

A vehicle window typically has two major surfaces and a peripheral edge portion. The two major surfaces are herein identified as major inner and major outer surfaces. An electrically conductive material, such as a conductive ceramic frit is typically disposed on one or more predetermined areas of the major inner surface of the vehicle window.

An assembly fixture has a major surface on which various components for making the vehicle window assembly may be mounted, such as: one or more resilient vertical gaseous positioning members, one or more induction coil assemblies, one or more fixed or movable x-y positioning members and one or more movable assembly aids. The one or more assembly aids have one or more items of hardware disposed therein. Typically, the items of hardware have a predetermined amount of solder disposed thereon.

In the method according to the invention, when a glass substrate such as a vehicle window is placed on the assembly fixture, the major outer surface of the vehicle window faces the major component mounting surface of the assembly fixture. To ensure that the vehicle window is properly positioned on the assembly fixture, the one or more x-y positioning members are utilized, and then, preferably, a negative gaseous pressure is exerted through the one or more resilient vertical gaseous positioning members to draw the major outer surface of the vehicle window into intimate contact therewith through movement in a z direction. In this positioning process, the one or more induction coil assemblies will be positioned proximate, but preferably not in intimate contact with, the major outer surface of the vehicle window. In particular, it is desirable that the one or more induction coil assemblies is/are positioned opposite the one or more portions of the major inner surface of the vehicle window on which the electrically conductive material has preferably been disposed.

Sequentially or simultaneously, the one or more induction coil assemblies are energized to selectively direct one or more electromagnetic fields into the one or more predetermined areas of the vehicle window whereon the electrically conductive material has been disposed, causing heating thereof by heating substantially through the thickness of the glass comprising the vehicle window, and the one or more assembly aids are activated so as to move into a predetermined position proximate the one or more heated areas of the major inner surface of the vehicle window.

From the assembly aid positioned proximate the major inner surface of the vehicle window, one or more items of hardware are discharged so as to come into bonding contact with the one or more heated areas of the major inner surface of the vehicle window. Alternatively, or additionally, the one or more items of hardware may be heated by the one or more induction coil assemblies. The one or more heated areas of the major inner surface of the vehicle window and/or the item of hardware to be bonded will be heated to a temperature sufficient to melt the solder disposed on the one or more items of hardware. The method of heating the one or more predetermined areas of the major inner surface of the vehicle window by the one or more induction coil assemblies located proximate the major outer surface of the vehicle window has been found to improve, among other things, the effective bonded area between the item of hardware and the major inner surface of the vehicle window compared to known bonding methods.

The one or more induction coil assemblies are then de-energized, allowing the vehicle window to cool and the molten solder to solidify, creating the desired bonding of the item of hardware to the major inner surface of the vehicle window. The vehicle window is then released from its position on the assembly fixture and a vehicle window assembly with one or more items of hardware bonded thereon is ready for additional processing, or for installation in a vehicle.

In a preferred configuration, the one or more assembly aids is a component of a rotatable assembly such that the assembly aid moves in an arc-like path from its at-rest position to its position proximate the major inner surface of the vehicle window, where it may discharge the one or more items of hardware disposed therein into bonding contact with the one or more predetermined areas of the major inner surface of the vehicle window, as previously described.

BRIEF DESCRIPTION OF THE DRAWINGS

The above, as well as other advantages of the present invention will become readily apparent to those skilled in the art from the following detailed description when considered in the light of the accompanying drawings in which:

FIG. 7a shows a plan view of a hardware holding member with an item of hardware contained therein.

FIG. 7b shows a view of an embodiment of a hardware holding member as shown in FIG. 7a and a system of negative gaseous pressure which can be used to hold an item of hardware in place in the hardware holding member according to the invention.

FIG. 8 shows a cross-sectional view of a hardware holding member and a mechanical means which may be utilized to mechanically push an item of hardware from the hardware holding member via the one or more recesses through the hardware holding member according to the invention.

DETAILED DESCRIPTION OF THE PREFERRED EMBODIMENTS

Figure 1:
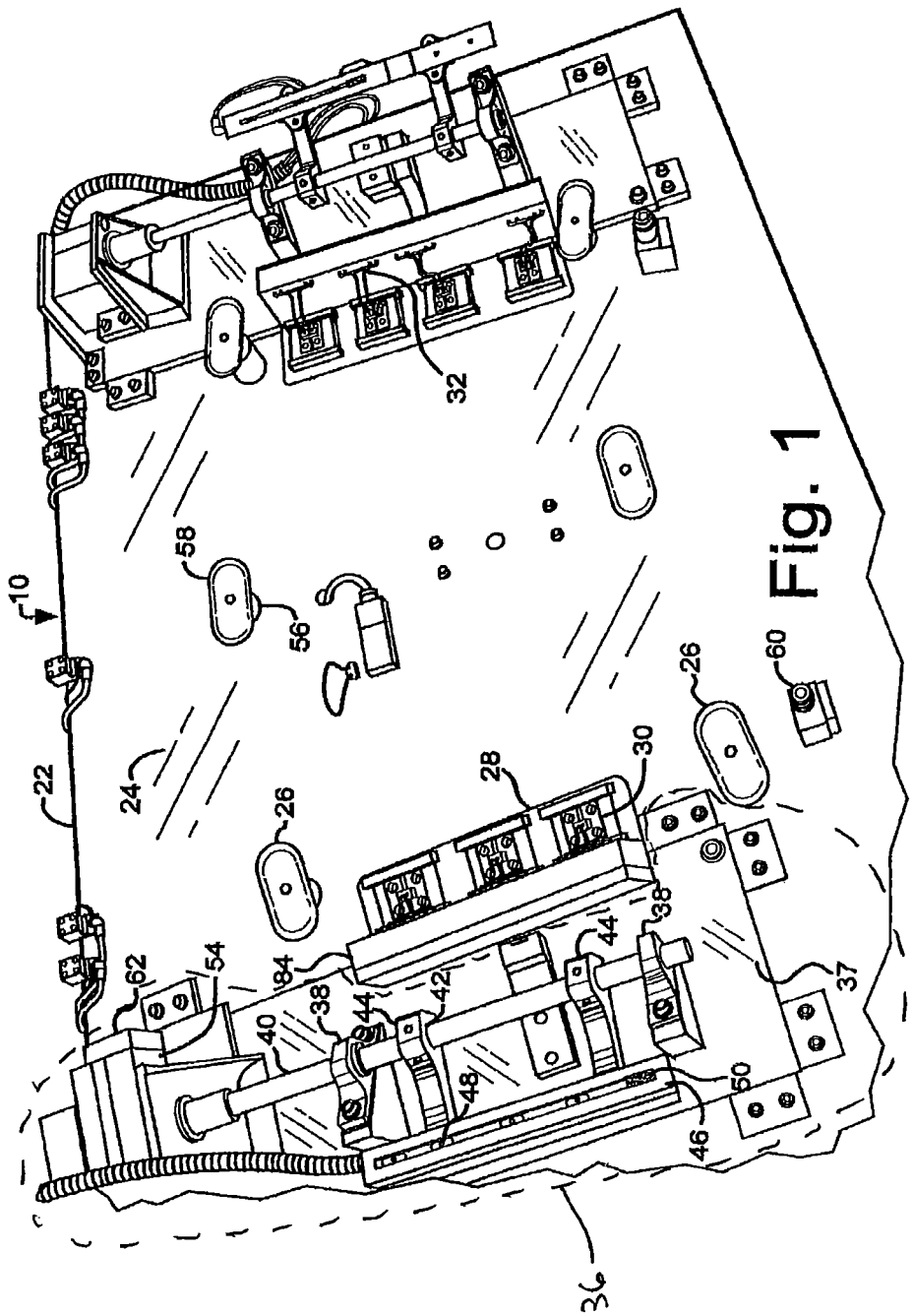
FIG. 1 shows a perspective view of an assembly fixture according to the invention.
Figure 2:
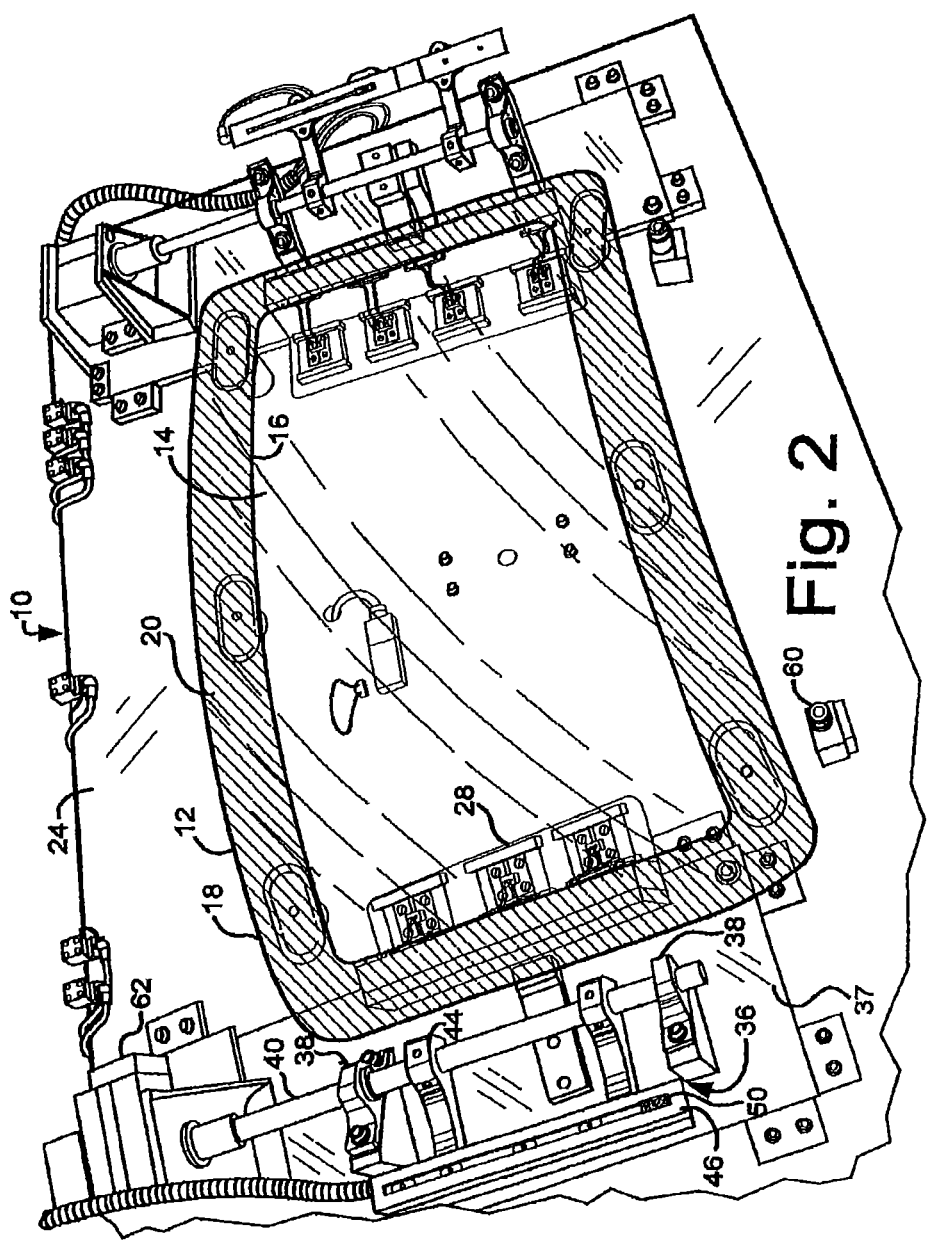
FIG. 2 shows a perspective view of the assembly fixture according to the invention with a vehicle window disposed on the assembly fixture.

The present invention relates to a method and apparatus for bonding an item to a substrate. More particularly, the invention relates to bonding an item or items of hardware 8 to a glass substrate by induction soldering, utilizing an assembly fixture 10.

A vehicle window 12 is typically made of glass. A vehicle window 12 typically also has two major surfaces (14, 16) and a surrounding peripheral edge portion 18. The two major surfaces (14, 16) are herein identified as the major inner surface 14 and major outer surface 16. An electrically conductive material 20, such as an electrically conductive ceramic frit, preferably containing an electrically conductive metal, for example silver, is disposed on one or more predetermined areas of the major inner surface 14 of the vehicle window 12 by any known method, for example, by screen printing.

An assembly fixture 10 such as shown in FIG. 1 is the preferred apparatus to form a vehicle window assembly according to the invention. A base plate 22, having a major component mounting surface 24, preferably has mounted thereon:

one or more resilient vertical gaseous positioning members 26 located so as to evenly support a vehicle window 12 a predetermined substantially uniform vertical distance above the major component mounting surface 24, the one or more resilient gaseous positioning members 26 preferably being connected to a source of positive and/or negative gaseous pressure (not shown);

one or more induction coil assemblies 28 which include a base member 30 mounted to the major component mounting surface 24, one or more induction coils 32 attached to the base member 30 and preferably extending a predetermined substantially uniform vertical distance above such base member 30;

at least one non-abrasive material 34 preferably covering the portion of the induction coil 32 which is proximate a major outer surface 16 of the vehicle window 12 when such vehicle window 12 is placed on the assembly fixture 10, more particularly, in contact with the one or more resilient vertical gaseous positioning members 26;

one or more assembly aids 36 which preferably include: a base plate 37 mounted to the major component mounting surface 24, at least one bearing mount 38 attached to the base plate 37, a rotatable shaft 40 extending through the at least one bearing mount 38, the rotatable shaft 40 also extending through a second end 42 of at least one support arm 44, at least one hardware holding member 46 attached to a first end of the at least one support arm 44, the hardware holding member 46 having one or more hardware retention recesses 50 formed therein and one or more openings or recesses 52 extending through the hardware retention recess 50 and preferably connected to a source of positive and/or negative gaseous pressure 53, the rotatable shaft 40 being connected to a motor 54 of any suitable kind, for example, an electric motor.

The operation of the components of the assembly fixture 10 is controlled by one or more electronic controllers (not shown) of any suitable conventional type(s). Such controllers are connected to a source of electric power by any suitable conventional means.

The base plate 22 of the assembly fixture 10 having the major component mounting surface 24 may be any suitable geometric shape, but is preferably square or rectangular, and may be made from any suitable material, but is preferably a metal such as aluminum.

The one or more resilient vertical gaseous positioning members 26 can be mounted in any suitable location on the major component mounting surface 24, but are preferably located so as to securely support the vehicle window 12 at a uniform height relative to the major component mounting surface 24. The vertical gaseous positioning member 26 includes a vertical support portion 56 and a resilient contact portion 58. The vertical support portion 56 is preferably a hollow tube of a predetermined length made from a durable and dimensionally stable material such as a metal. The resilient contact portion 58 is typically connected to an upper end of the vertical support portion 56 and, when a vehicle window 12 is placed on the assembly fixture 10, is in intimate contact with a portion of, typically the major outer surface 16 of, the vehicle window 12. As the vehicle window 12 is usually made from glass, which can be scratched, the resilient contact portion 58 is desirably made from a flexible, non-abrasive material, such as a plastic or rubber material.

Figure 3:
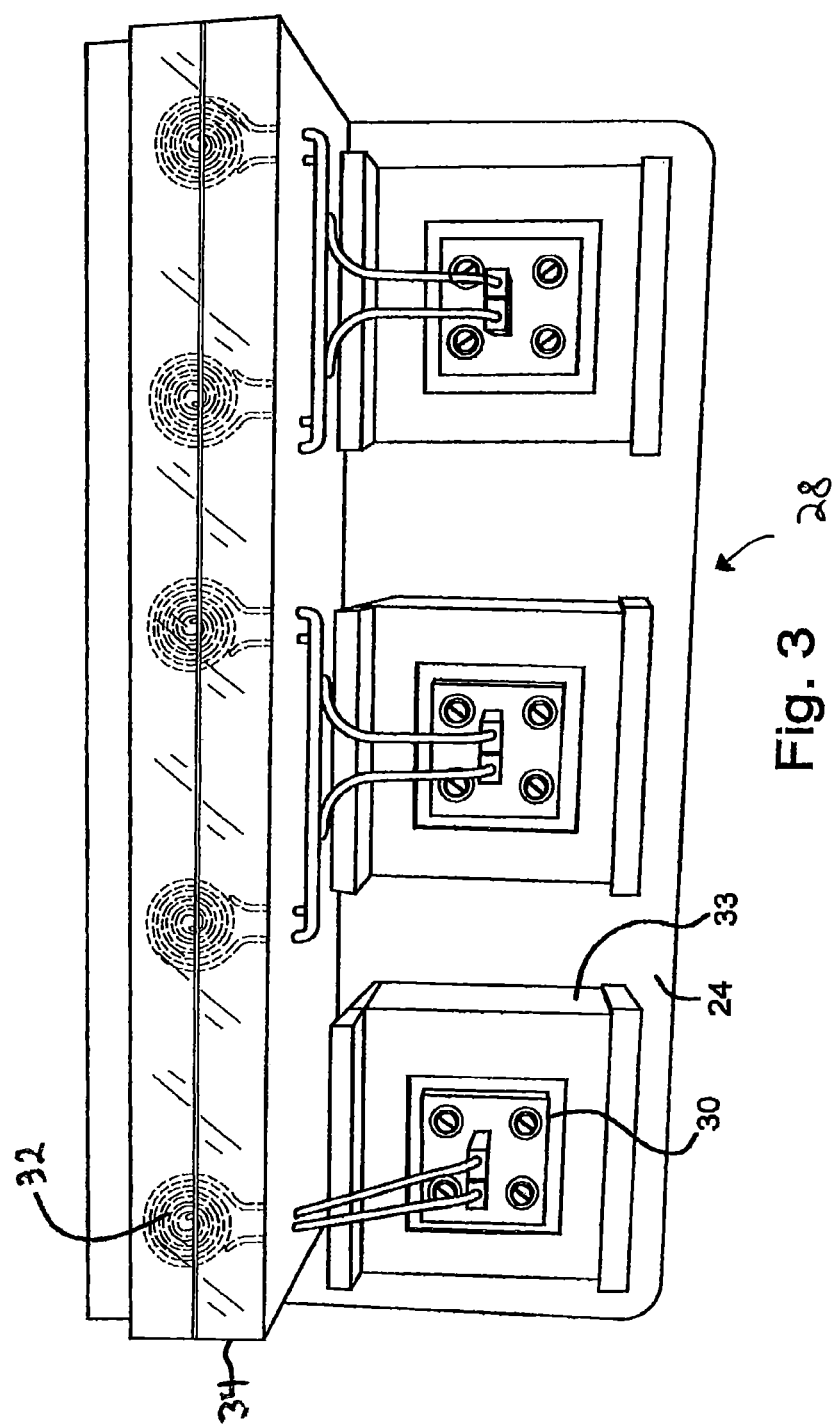
FIG. 3 shows a perspective view of an induction coil assembly according to the invention.
Figure 4:
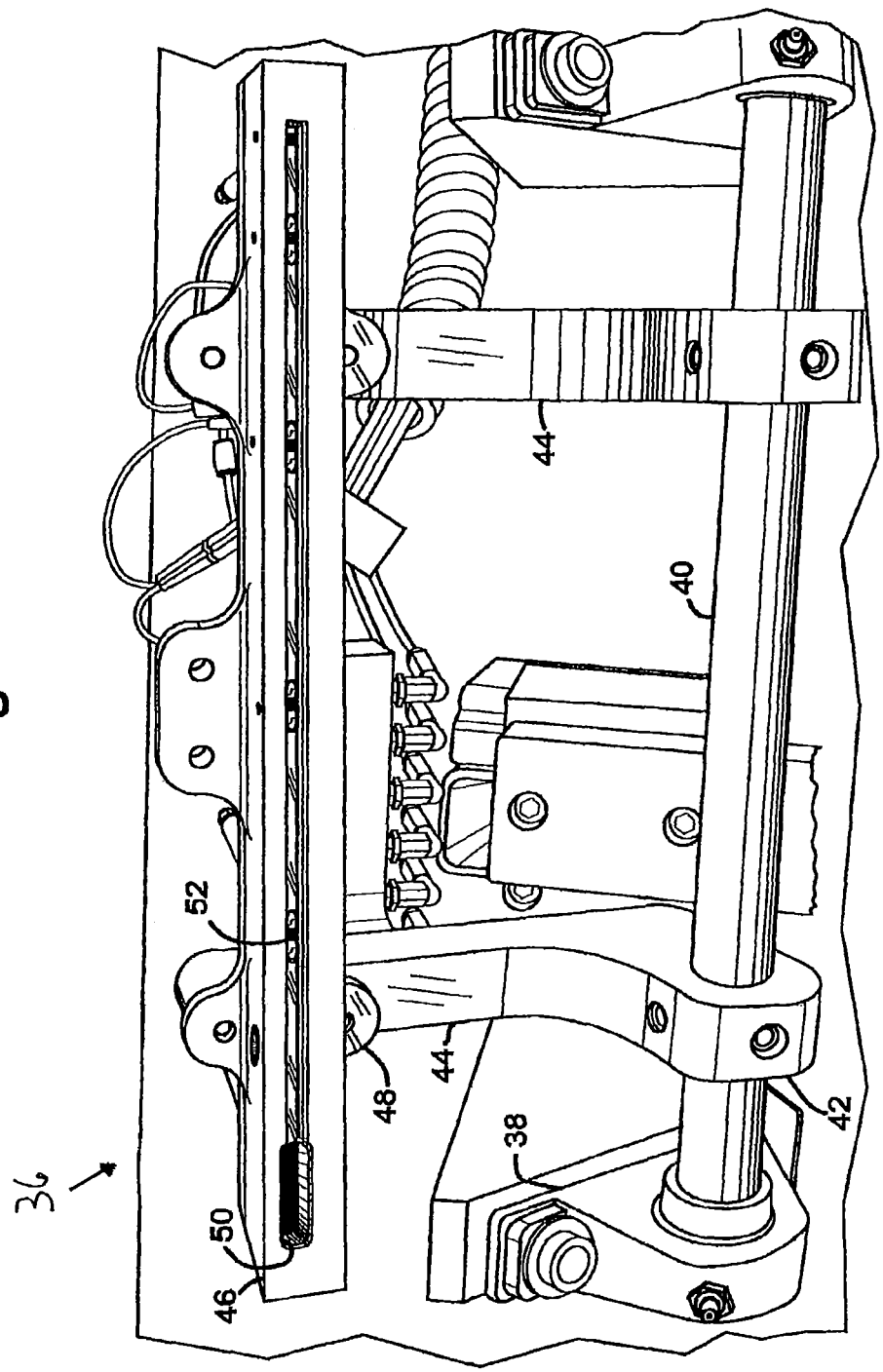
FIG. 4 shows a perspective view of a movable assembly aid according to the invention.
Figure 5:
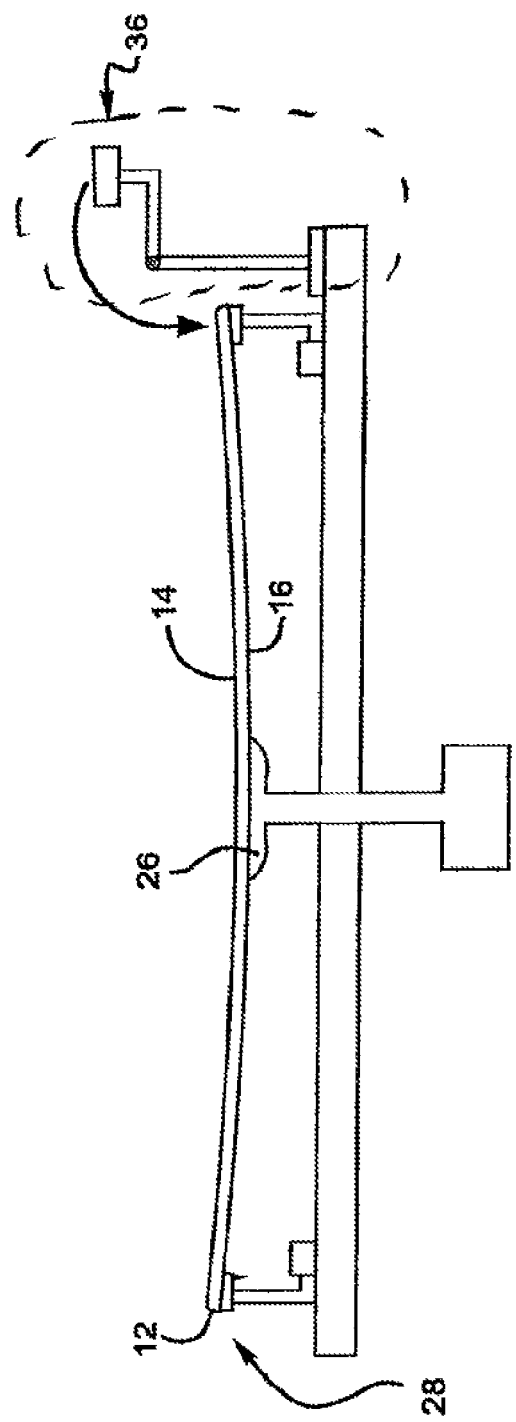
FIG. 5 shows a cross-sectional view of an assembly fixture with the assembly aid movable relative to the vehicle window disposed on the assembly fixture according to the invention.
Figure 6:
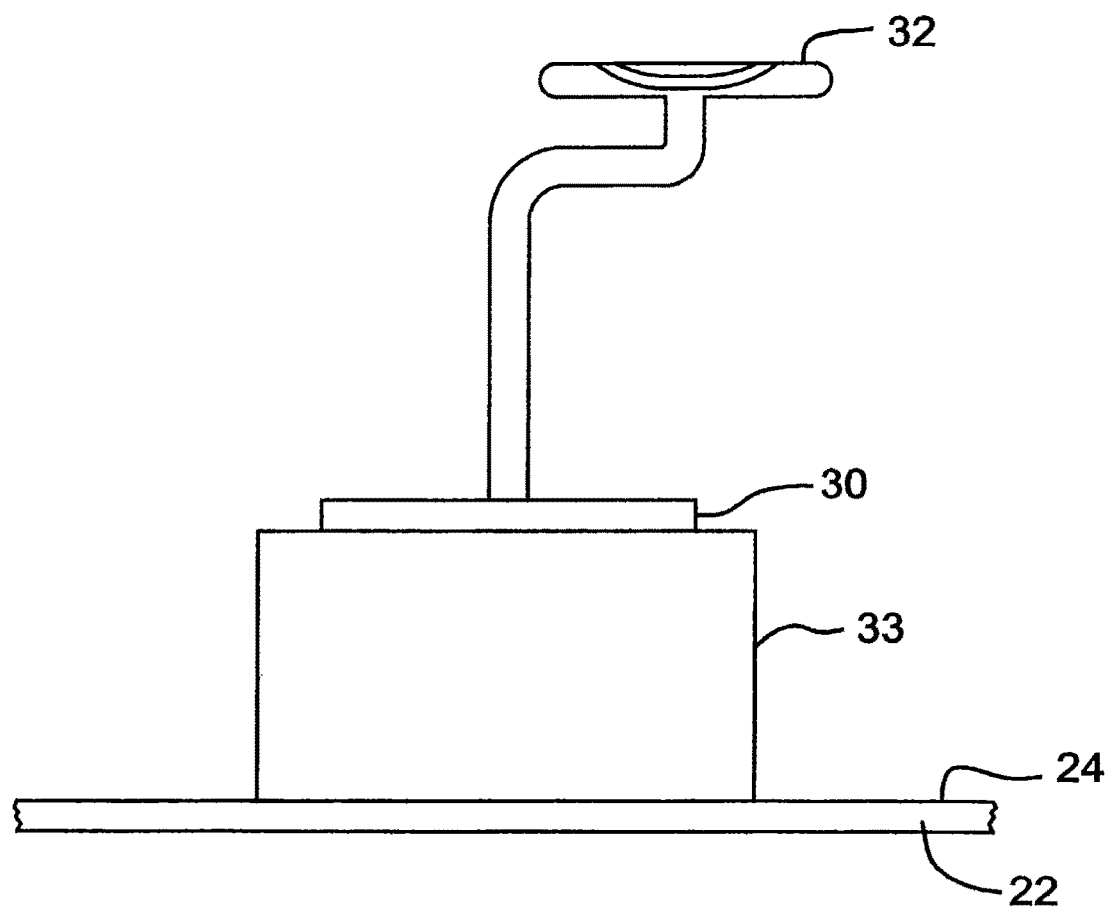
FIG. 6 shows a cross-sectional view of an induction coil assembly according to the invention.

The one or more induction coil assemblies 28 as shown in FIG. 3 can include one or more induction coils 32 such as are generally commercially available, or are custom-fabricated. Such suitable induction coils 32 are made by, for example, Magneforce, Inc. of Warren, Ohio. The configuration of the coil 32 itself can be any suitable configuration best suited to direct the electromagnetic field generated by electromagnet 33 in, for example, a broad or very focused pattern, as desired. While the power output of each induction coil assembly 28 can be the same or different, in a preferred configuration, each induction coil assembly 28 preferably has a power output of at least 1,000 W.

As the induction coil 32 is typically made of a metal material which can abrade the glass of the major outer surface 16 of the vehicle window 12 when the two come into contact, it is desirable to prevent such damage to the glass, preferably by covering the portion of the induction coil 32 which is proximate the major outer surface 16 of the vehicle window 12 with one or more layers of a durable, but non-abrasive material 34 when the vehicle window 12 is positioned on the assembly fixture 10. Such materials may include, for example, fiberglass, stainless steel mesh, suitable plastic and rubber materials, suitable silicone materials and cotton cloth. Alternatively, the induction coils themselves may be coated with a suitable epoxy material.

A method of forming a vehicle window assembly utilizing the assembly fixture 10 previously described will now be set out.

A vehicle window 12 having a major inner surface 14 with an electrically conductive material preferably disposed on one or more predetermined areas thereof, a major outer surface 16 and a peripheral edge portion 18 therearound is placed on an assembly fixture 10 with the major outer surface 16 of the vehicle window 12 in intimate contact with one or more resilient vertical gaseous positioning members 26 which are mounted on a major component mounting surface 24, and proximate one or more induction coil assemblies 28 also mounted on the major component mounting surface 24. Proximate the peripheral edge portion 18 of the vehicle window 12 are preferably located one or more positioning members (60, 62) which may be fixed or movable, so as to precisely position the vehicle window 12 on the assembly fixture 10 in both the x and y directions of the plane of the vehicle window 12. Preferably, the positioning members in the x direction are fixed 60, and the positioning members 62 in the y direction are movable, as shown, for example, in FIG. 1. Once the vehicle window 12 is precisely positioned on the assembly fixture 10 in the x and y directions, a negative gaseous pressure is preferably applied through one or more openings in the one or more resilient vertical gaseous positioning members 26 so as to draw down the vehicle window 12 in a z direction into even more intimate positioning contact with the one or more resilient vertical gaseous positioning members 26. Further, the now precisely positioned vehicle window 12 has the one or more portions thereof with the electrically conductive material 20 preferably disposed thereon proximate one or more induction coil assemblies 28.

The one or more induction coil assemblies 28 are then energized so as to selectively direct the one or more electromagnetic fields generated by the induction coil assemblies 28 into the glass comprising the vehicle window 12, causing heating of the one or more areas of the major inner surface 14 of the vehicle window 12 having the electrically conductive material 20 disposed thereon. To make the inventive method compatible with high-volume glass manufacturing operations, the electrically conductive material 20 is preferably heated to a temperature of between 100° F. and 600° F. in less than 20 sec, at a power output of ≥1,000 W per induction coil assembly 28.

One skilled in the art will appreciate that the electromagnetic fields generated by the electromagnet 33 of the one or more induction coil assemblies 28 readily pass through the thickness of the dielectric glass sheet comprising the vehicle window 12, but impart the bulk of their energy to the item of hardware 8 to be bonded and the solder disposed thereon and to the electrically conductive material 20, such as a conductive ceramic frit on the major inner surface 14 of the vehicle window 12.

A further aspect of the invention relates to the one or more movable assembly aids 36 by which items of hardware 8 are moved into a position proximate the heated electrically conductive material 20 disposed on the major inner surface 14 of the vehicle window 12. The portion of the assembly aid 36 in which the one or more items of hardware 8 is disposed is referred to herein as a hardware holding member 46, which is preferably made from a dielectric material, such as a resin or other polymeric material. Preferably, recesses 52 are formed in the hardware holding member 46 to hold the one or more items of hardware 8 in preparation for bonding such items of hardware 8 to the vehicle window 12. In a preferred configuration, a portion of the recess 52 extends through the thickness of the material of the hardware holding member 8, which extended recess 52 may be connected to a source of positive and/or negative gaseous pressure 53. Application of negative gaseous pressure can assist in positively retaining the items(s) of hardware 8 in the hardware holding member 46, while application of positive gaseous pressure may be used to discharge the one or more items of hardware 8 from the hardware holding member 46.

As an alternative to utilizing positive gaseous pressure to discharge items of hardware 8 from the hardware holding member 46, it may be desirable to utilize a mechanical means 68 to push the items of hardware 8 from the one or more recesses 52 in the one or more hardware holding members 46. Such mechanical means 68 may include a cylinder having an extendable anterior member 70 aligned with the one or more extended recesses 52 in the hardware holding members 46. Such cylinders may be, for example, a pneumatic or a hydraulic cylinder. Activation of the cylinder causing the extendable anterior member 70 to extend into the recess 52 will then discharge the item of hardware 8 in the recess 52 for purposes of causing such item of hardware 8 to bondingly contact the major inner surface of the vehicle window 12 upon which the electrically conductive material 20 has been disposed. Mechanical means can also be utilized to retain the item(s) of hardware 8 in the hardware holding member 46.

The movable assembly aid 36, of which the hardware holding member 46 is a component, is activated so as to cause, by any suitable means, the hardware holding member 46 to move to a position proximate the one or more portions of the major inner surface 14 of the vehicle window 12 on which the electrically conductive material 20 is preferably disposed and which is heated by the one or more induction coil assemblies 28. The subject portions of the major inner surface 14 of the vehicle window 12 and/or the items of hardware 8 are heated to a temperature sufficient to melt the solder preferably disposed on the one or more items of hardware 8.

In a preferred configuration, the hardware holding member 46 is attached to a first end 48 of one or more support arms 44. A second end 42 of the one or more support arms 44 is connected to a rotatable shaft 40. The rotatable shaft 40 also extends through one or more bearing mounts 38 or like structure which are mounted to the major component mounting surface 24 of the assembly fixture 10. One end of the rotatable shaft 40 is connected to a motor 54. When the shaft 40 rotates, the assembly aid 36, in particular the hardware holding member or members 46, is caused to move, preferably in an arc-like manner, for example, an arc of up to about 180°, so as to position the hardware holding member 46 proximate the major inner surface 14 of the vehicle window 12. The items of hardware 8 are then discharged from the hardware holding member 46 as previously described herein.

The induction coil assemblies 28 are de-energized so as to allow the vehicle window 12 and the solder to cool, and the one or more items of hardware 8 to bond to the major inner surface 14 of the vehicle window 12. At an appropriate time, the negative gaseous pressure applied through the one or more resilient vertical gaseous positioning members 26 is discontinued, and the finished vehicle window assembly is removed from the assembly fixture 10.

When made by the method described, the inventors have found that the bonded area between the item of hardware 8 and the heated portion of the vehicle window 12 is significantly increased over known methods, for example, the bonded area is >50%, preferably >90%, of the total possible bonding area as "wetting out" of the solder is improved. It has also been found that wear on components such as the induction coil assemblies 28 and on the assembly aids 36 is reduced from known methods. Additionally, solder does not build up on the induction coil assemblies 28, as they are on the opposite side of the vehicle window 12 from the assembly aids 36.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of forming a vehicle window assembly by induction heating, comprising:
    providing a vehicle window having a major inner surface with a conductive ceramic frit disposed on at least a predetermined area thereof, a major outer surface and a peripheral edge portion therearound;
    placing the vehicle window on an assembly fixture having one or more induction coil assemblies and one or more movable assembly aids mounted on the assembly fixture, wherein the major outer surface of the vehicle window faces the assembly aid;
    disposing one or more items of hardware having a predetermined amount of solder thereon, in the one or more movable assembly aids, the assembly aids comprising:
        at least one bearing mount;
        a rotatable shaft extending through the at least one bearing mount;
        the rotatable shaft also extending through a second end of at least one support arm; and
        at least one hardware holding member attached to a first end of the at least one support arm;
    energizing the one or more induction coil assemblies proximate the major outer surface of the vehicle window to selectively direct one or more electromagnetic fields through the vehicle window causing heating of the one or more areas of the major inner surface of the vehicle window upon which the ceramic frit is disposed to a temperature sufficient to liquefy the solder on the one or more items of hardware; and
    moving the one or more assembly aids into a position proximate the one or more heated areas of the major inner surface of the vehicle window and causing one or more items of hardware in the one or more assembly aids to move into bonding contact with the one or more heated areas of the major inner surface of the vehicle window.

2. The method defined in claim 1, wherein the one or more assembly aids is moved proximate the vehicle window by a rotating assembly in an arc-like manner.

3. The method defined in claim 1, wherein the ceramic frit is heated to a temperature of between 100° F. and 600° F.

4. The method defined in claim 3, wherein the ceramic frit is heated to the desired temperature in less than 20 sec at a power output of greater than 1000 W per induction coil assembly.

5. The method defined in claim 1, wherein the assembly aids comprises a base plate.

6. The method defined in claim 5, wherein the at least one bearing mount is attached to the base plate.

7. The method defined in claim 5, wherein one or more hardware retention recesses are formed in the hardware holding member.

8. The method defined in claim 7, wherein one or more openings extend through the hardware retention recess and are connected to a source of positive and negative gaseous pressure.

9. The method defined in claim 8, wherein the assembly aid comprises at least one pneumatic or hydraulic cylinder having an extendable anterior member which is aligned with the one or more openings in the hardware retention recess.

10. The method defined in claim 1, wherein the one or more induction coil assemblies each have a power output greater than 1000 W.

11. The method defined in claim 1, wherein the power output of the induction coil assembly is capable of being selectively directed into an area of the substrate >10 mm$^2$.

12. The method defined in claim 1, wherein the induction coil assembly is capable of heating the chosen area of the substrate to a temperature up to 600° F. in less than 20 sec.

13. A method of forming a vehicle window assembly by induction heating, comprising:
    providing a vehicle window having a major inner surface with an electrically conductive material disposed on at least a predetermined area thereof, a major outer surface and a peripheral edge portion therearound;
    placing the vehicle window on an assembly fixture having one or more induction coil assemblies and one or more movable assembly aids mounted on the assembly fixture, wherein the major outer surface of the vehicle window faces the assembly aid;
    disposing one or more items of hardware having a predetermined amount of solder thereon, in the one or more movable assembly aids, the assembly aids comprising:
        at least one bearing mount;
        a rotatable shaft extending through the at least one bearing mount;
        the rotatable shaft also extending through a second end of at least one support arm; and
        at least one hardware holding member attached to a first end of the at least one support arm;
    energizing the one or more induction coil assemblies proximate the major outer surface of the vehicle window to selectively direct one or more electromagnetic fields through the vehicle window causing heating of the one or more areas of the major inner surface of the vehicle window upon which the electrically conductive material is disposed to a temperature sufficient to liquefy the solder on the one or more items of hardware; and moving the one or more assembly aids into a position proximate the one or more heated areas of the major inner surface of the vehicle window and causing one or more items of hardware in the one or more assembly aids to move into bonding contact with the one or more heated areas of the major inner surface of the vehicle window.

14. The method defined in claim 13, wherein the electrically conductive material is a ceramic frit.

* * * * *